Patented June 14, 1938

2,120,552

UNITED STATES PATENT OFFICE 2,120,552

COLORATION OF MATERIALS

George Holland Ellis and Alexander James Wesson, Spondon, near Derby, England, assignors to Celanese Corporation of America, a corporation of Delaware No Drawing. Application September 25, 1935, Serial No. 42,025. In Great Britain October 2, 1934

14 Claims. (Cl. 8—5)

This invention relates to the coloration of materials and more particularly to the production of stains suitable for the coloration of mixed materials comprising cellulose acetate or other cellulose ester or ether.

Sometimes it is required to color textile materials which are in such a form that they must not be immersed in a dyebath. Thus for example shoes having fabric uppers cannot conveniently be colored by bath methods. The uppers are therefore frequently colored by the application thereto of a stain, the latter being painted on, or otherwise applied in restricted quantities, and dried on the material. Where the material is a mixed material comprising components having different affinities for different classes of dyestuffs, however, difficulty arises in the production of uniform coloration on the material. Thus for example cellulose acetate and regenerated cellulose artificial silk have affinities for different classes of dyestuffs so that considerable difficulty arises in the coloration of mixed materials containing these components.

The surprising discovery has now been made that although acid dyestuffs have very little affinity for cellulosic materials, yet excellent uniform colorations can be obtained on mixed materials comprising an ester or ether of cellulose and other components, particularly cellulosic components, by the application to the materials of solutions of dyestuffs having an affinity for cellulose esters and ethers and acid dyestuffs in an organic solvent. Accordingly the present invention comprises compositions containing water insoluble dyestuffs having an affinity for cellulose esters and ethers and acid dyestuffs, said compositions not containing substantial amounts of water. Solutions of these compositions in organic solvents, which may be used as stains, are also included within the invention.

The stains are capable of coloring materials containing for example cellulose esters or ethers, or regenerated cellulose, or silk, or mixtures of these materials in shades fast to light, a property not shared by dyestuffs of any one class, and the coloration of mixed materials containing any of these fibres with the stains of the present invention is also included within the ambit of the invention.

The dyestuff having affinity for cellulose esters and ethers may be any convenient water insoluble dyestuff having an affinity for an organic derivative of cellulose. Examples of such dyestuffs are the amino anthraquinone dyestuffs and the pyrazolone azo dyestuffs, e. g. benzene-azo-1- phenyl-3-methyl-5-pyrazolone and other dyestuffs e. g. azo dyestuffs having affinity for cellulose esters or ethers, and mention may be made of the dyestuffs sold under the names S. R. A., Celliton and Dispersol.

Any desired acid color having the requisite solubility in the solvent of the stain may be employed. Acid dyestuffs of high molecular weight are, however, of less value than acid dyestuffs of low molecular weight for the purposes of the present invention and it is preferred therefore to employ acid dyestuffs of relatively low molecular weight. The term "acid dye" as used in this specification means a dye containing acid groups and capable of dyeing wool from an acid bath. It does not include dyestuffs having a substantive affinity for cotton.

Examples of acid dyestuffs suitable for incorporation in the compositions and stains of the present invention are Erio Flavine 3G Conc. (Colour Index No. 636), Orange IV (L. B. H.) (Colour Index No. 143), Orange L (L. B. H.) (Colour Index No. 78), Brilliant Sulphon Red B. (Colour Index No. 32), Soluble Blue 487 (C. A. C.) (Colour Index No. 707), Coomassie Violet R. (Colour Index No. 698), Alizarine Blue FF (Colour Index No. 1066), Direct Black 3131 (C. A. C.), Rose Bengale (Colour Index No. 777), Fast Acid Blue RH (Colour Index No. 208), Erioglaucine A (Colour Index No. 671), Erio Flavine 3G (Colour Index No. 636), Croceine Scarlet 3B DS (Colour Index No. 277) and Patent Blue 9879 (L. B. H.) (see L. B. Holliday Pattern Card, 1924, "Acid dyes for wool hats"). Compositions in which the content of dyestuff having affinity for cellulose acetate is between 35% and 75% of the total dyestuff content generally give good results.

The dyestuff compositions may contain any other desired substances, the presence of dispersing or wetting agents such for example as Turkey red oil, sulphuric acid esters of oleyl and other higher aliphatic alcohols, alkyl substituted naphthalene sulphonic acids and the like being particularly advantageous in that the solution of the compositions in organic solvents is thereby facilitated.

For the production of the stains the organic solvent must be chosen with due attention to its solvent properties for the dyestuffs employed. It furthermore should be such as will not damage textile materials and it is advantageous that it should be at least partially miscible with water. In the case of a solvent liable to damage cellulose derivatives by virtue of its strong swelling action thereon, it should be diluted with another liquid which has little or no swelling action on cellulose derivatives. Examples of solvents which may be employed alone or in admixture are esters particularly those at least partially miscible with water, monohydric alcohols, for example methyl, ethyl, propyl or amyl alcohol, di- or poly-hydric alcohols e. g. diethylene glycol and triethylene glycol, and esters or ethers of di- or polyhydric alcohols. Water may also be employed in conjunction with the organic solvent in quantities which do not prevent solution of the desired proportion of dyestuffs.

Penetration of the dyestuff into any cellulose derivative portion of the materials may be aided by the use of assistants such for example as swelling agents or solvents for cellulose esters and ethers. Many of the dye solvents which may be employed, however, themselves have such a swelling action on cellulose derivatives that the addition of further solvents or swelling agents is unnecessary. Examples of suitable swelling agents or solvents which may be used for this purpose are formal-glycerol, ethyl lactate, diacetone alcohol, the glycols, and many of their esters and ethers, aromatic sulphonamides, phenols, hydroquinone and the like. The use of a dyestuff solvent of boiling point below 100° C., e. g. below 90° C., in conjunction with a small proportion, e. g. 1–5%, of a cellulose ester or ether swelling agent of boiling point above 100° C. and especially above 120° C., is particularly to be recommended. It is furthermore frequently desirable when preparing the dyestuff solutions, especially when water is present, to employ dispersing and wetting agents, such for example as Turkey red oil, to aid solution and further to facilitate coloration of the materials, and these agents also may form part of the composition of the present invention.

The solutions of the dyestuffs may be prepared in any convenient manner and may be brought about by direct solution of the mixed dyestuffs, or by the separate solution of each class of dyestuffs. For the separate solution in methylated spirits of the dyestuff having affinity for cellulose esters and ethers and of the acid dyestuff it has been found convenient to warm the dry powdered cellulose ester or ether dyestuff with ethyl lactate and a dispersing agent such for example as Turkey red oil or Gardinol C. A. and then to add the methylated spirits. Thus for example 0.6 gram of dyestuff powder may be warmed with 3 ccs. of ethyl lactate or formal glycerol and 1 cc. of Turkey red oil, and 94 ccs. of methylated spirits then added. The required quantity of acid dyestuff is pasted with 50 ccs. of water and warmed, an equal amount of methylated spirits being added. The solutions of both dyestuffs are then mixed giving a total of 200 ccs. of a stain which may be applied for example by brushing, spraying, stenciling or the like to mixed fabric containing cellulose acetate and viscose. The proportions of the dyestuff may be varied as desired in order to give uniform effects. Though of greatest value for the production of uniform colorations the properties of the stains may be such as to give differential color effects. Where such differential effects are desired the acid dyestuff may be of a different color or in such different proportion as to give a different color on the cellulosic constituent of the materials from that on the other constituent.

In the case of a black stain it has been found desirable to use greater proportions of wetting agents, swelling agents and the like than those indicated in the above example. A good black stain may be prepared from the following:—
1:4-di-(ethanolamino)-5-oxy-anthraquinone 2 grams, 1-amino-4-hydroxy-anthraquinone 0.17 grams, benzene-azo-1-naphthalene-4-azo-4'-phenol 0.1 gram, Direct Black 3131 2.5 grams, Erioglaucine A (Colour Index No. 671) 0.2 gram, ethyl lactate 5 ccs., Turkey red oil 2 ccs., Gardinol CA 0.3 gram, isomeric xylene monomethyl sulphonamides 3 ccs., water 50 ccs., methylated spirits 140 ccs.

The stains of the present invention may be applied in any convenient manner e. g. by brushing, spraying and the like and may be applied uniformly or locally. After application of the dyestuff solution, the materials are simply dried.

The following is a list of dyestuff mixtures suitable for the production of a range of stains:—

| Shade | Dyestuffs | Quantities |
|---|---|---|
| | | Parts |
| Greenish yellow | Celliton Yellow 5G (see Schultz "Farbstoff-Tabellen" 1928–1931, Band II, page 45). | 1 |
| | Erio Flavine 3G (Colour Index No. 636). | 1.2 |
| Golden orange | 2-nitro-4-chlor-4'-ethoxy diphenylamine. | 0.6 |
| | Orange IV (L. B. H.) (Colour Index No. 143). | 1.3 |
| Orange | Dispersol F Orange A powder (see British Dyestuffs Corp. Pattern Card S. C. 86, August 1928. | 1 |
| | Orange I (L. B. H.)(Colour Index No. 150). | 1.6 |
| | or | |
| | 2-nitro-4-chlor-4'-ethoxy diphenylamine. | 0.5 |
| | Erio Flavine 3G | 0.4 |
| | Orange I (L. B. H.) (Colour Index No. 150). | 0.3 |
| | Gardinol CA | 0.2 |
| Bright orange | p-Nitro-benzene-azo-4-diphenylamine. | 0.3 |
| | Orange I (L. B. H.) (Colour Index No. 150). | 1.0 |
| Yellowish red | Dispersol F Red A (see British Dyestuffs Corp. Pattern Card S. C. 86, August, 1928). | 1 |
| | Croceine Scarlet 3B (Colour Index No. 252). | 1.6 |
| Bluish red | Celliton F Pink F 3B (see I. G. Pattern Card, "Prints with Celliton and Celliton Fast Dyestuffs on Acetate Silk." Pattern No. 12). | 1.4 |
| | Rose Bengal (Colour Index No. 777). | 1.2 |
| Reddish blue | 1-methylamino-4-hydroxy anthraquinone. | 0.3 |
| | Soluble Blue (C. A. C.) 487 (similar to Colour Index No. 707). | 1.0 |
| | or | |
| | 1-methylamino-4-hydroxy anthraquinone. | 1 |
| | Fast Acid Blue RH (Colour Index No. 208). | 1.6 |
| | Gardinol CA | 0.2 |
| Violet | 1-amino-4-methylamino-anthraquinone. | 0.3 |
| | Coomassie Violet R. (Colour Index No. 698). | 0.8 |
| Greenish blue | 1:4-di-(ethanolamino)-5-oxyanthraquinone. | 1.0 |
| | Alizarine Light Blue FF (see Schultz "Farbstoff-Tabellen, Supplement, 1930, page 64). | 1.1 |
| | or | |
| | Celliton Fast Blue Green B (see Schultz "Farbstoff-Tabellen", (1928–31) Band II, page 45). | 1.4 |
| | Patent Blue 9879 (L. B. H.) (see L. B. Holliday Pattern Card, 1924 "Acid Dye for Wool Hats"). | 1.8 |

As has been indicated, the present invention is particularly valuable where it is desirable to color the materials after they have been made up and when it is undesirable to immerse them in a dyebath. Shoes having fabric uppers have already been mentioned in this respect. Other examples are ladies' handbags having metal fittings, or electrical wiring or cable having a fabric cover to the insulation.

While the invention has been described more particularly in connection with the coloration of mixed materials containing cellulose acetate, it may equally be applied to the coloration of materials containing other cellulose esters or ethers e. g. cellulose formate, cellulose propionate, cellulose butyrate or ethyl or benzyl cellulose. The stains are also applicable in the coloration of mixed materials containing no cellulose ester or ether.

In the accompanying claims the term "organic derivative of cellulose" is used as connoting a cellulose ester or ether.

What we claim and desire to secure by Letters Patent is:—

1. A stain for coloring textile fabrics, said stain comprising an acid dye, a water-insoluble dye having affinity for cellulose acetate, and a dispersing agent, together in solution in a liquid containing, as the major constituent, an organic solvent for the water-insoluble dye.

2. A stain for coloring textile fabrics, said stain comprising an acid dye, a water-insoluble dye having affinity for cellulose acetate, and a dispersing agent, together in solution in a water-containing liquid containing, as the major constituent, a water-miscible organic solvent for the water-insoluble dye.

3. A stain for coloring textile fabrics, said stain comprising an acid dye, a water-insoluble dye having affinity for cellulose acetate, and a dispersing agent, together in solution in a liquid containing water in a quantity capable of dissolving the acid dye, and, as the major constituent, a water-miscible organic solvent in a quantity capable of dissolving the cellulose acetate dye.

4. A stain for coloring textile fabrics, said stain comprising an acid dye, a water-insoluble dye having affinity for cellulose acetate, and a dispersing agent, together in solution in a liquid containing a small proportion of a cellulose acetate swelling agent of boiling point above 120° C. and, as the major constituent, an organic solvent for the water-insoluble dye, of boiling point below 90° C.

5. A stain for coloring textile fabrics, said stain comprising an acid dye, a water-insoluble dye having affinity for cellulose acetate, and a dispersing agent, together in solution in a liquid containing an alcohol as the major constituent.

6. A stain for coloring textile fabrics, said stain comprising an acid dye, a water-insoluble dye having affinity for cellulose acetate, and a dispersing agent, together in solution in a liquid containing ethyl alcohol as the major constituent.

7. A stain for coloring textile fabrics, said stain comprising an acid dye, a water-insoluble dye having affinity for cellulose acetate, and a dispersing agent, together in solution in a liquid containing water, a small proportion of ethyl lactate and, as the major constitutent, ethyl alcohol.

8. Process of coloring textile fabrics containing both cellulose acetate and a cellulosic fibre, which comprises applying thereto a stain containing an acid dye, a water-insoluble dye having affinity for cellulose acetate, and a dispersing agent, together in solution in a liquid containing, as the major constituent, an organic solvent for the water-insoluble dye.

9. Process of coloring textile fabrics containing both cellulose acetate and a cellulosic fibre, which comprises applying thereto a stain containing an acid dye, a water-insoluble dye having affinity for cellulose acetate, and a dispersing agent, together in solution in a water-containing liquid containing, as the major contituent, a water-miscible organic solvent for the water-insoluble dye.

10. Process of coloring textile fabrics containing both cellulose acetate and a cellulosic fibre, which comprises applying thereto a stain containing an acid dye, a water-insoluble dye having affinity for cellulose acetate, and a dispersing agent, together in solution in a liquid containing water in a quantity capable of dissolving the acid dye, and, as the major constituent, a water-miscible organic solvent in a quantity capable of dissolving the cellulose acetate dye.

11. Process of coloring textile fabrics containing both cellulose acetate and cellulosic fibre, which comprises applying thereto a stain containing an acid dye, a water-insoluble dye having affinity for cellulose acetate, and a dispersing agent, together in solution in a liquid containing a small proportion of a cellulose acetate swelling agent of boiling point above 120° C. and, as the major constituent, an organic solvent for the water-insoluble dye, of boiling point below 90° C.

12. Process of coloring textile fabrics containing both cellulose acetate and cellulosic fibre, which comprises applying thereto a stain containing an acid dye, a water-insoluble dye having affinity for cellulose acetate, and a dispersing agent, together in solution in a liquid containing an alcohol as the major constituent.

13. Process of coloring textile fabrics containing both cellulose acetate and cellulosic fibre, which comprises applying thereto a stain containing an acid dye, a water-insoluble dye having affinity for cellulose acetate, and a dispersing agent, together in solution in a liquid containing ethyl alcohol as the major constituent.

14. Process of coloring textile fabrics containing both cellulose acetate and cellulosic fibre, which comprises applying thereto a stain containing an acid dye, a water-insoluble dye having affinity for cellulose acetate, and a dispersing agent, together in soluition in a liquid containing water, a small proportion of ethtyl lactate and, as the major constituent, ethyl alcohol.

GEORGE HOLLAND ELLIS.
ALEXANDER JAMES WESSON.